(12) United States Patent
Bergbaur et al.

(10) Patent No.: US 12,405,286 B2
(45) Date of Patent: Sep. 2, 2025

(54) PIPETTING DEVICE AND METHOD FOR THE TRANSFER OF FLUIDS

(71) Applicant: MEON MEDICAL SOLUTIONS GMBH & CO KG, Graz (AT)

(72) Inventors: Michael Bergbaur, St. Marein Bei Graz (AT); Stefan gulo, Riederhof (AT); Marco Jean-Pierre Leiner, Graz (AT); Wolfgang Sprengers, Vasoldsberg (AT)

(73) Assignee: MEON MEDICAL SOLUTIONS GMBH & CO KG, Graz (AT)

( * ) Notice: Subject to any disclaimer, the term of this patent is extended or adjusted under 35 U.S.C. 154(b) by 1036 days.

(21) Appl. No.: 17/421,010

(22) PCT Filed: Jan. 3, 2020

(86) PCT No.: PCT/AT2020/060002
§ 371 (c)(1),
(2) Date: Jul. 6, 2021

(87) PCT Pub. No.: WO2020/142798
PCT Pub. Date: Jul. 16, 2020

(65) Prior Publication Data
US 2022/0099694 A1 Mar. 31, 2022

(30) Foreign Application Priority Data

Jan. 11, 2019 (AT) .............................. A 50021/2019
Mar. 21, 2019 (AT) .............................. A 50250/2019

(51) Int. Cl.
*G01N 35/10* (2006.01)
*B01L 3/02* (2006.01)

(52) U.S. Cl.
CPC .......... *G01N 35/1072* (2013.01); *B01L 3/021* (2013.01); *G01N 35/1004* (2013.01);
(Continued)

(58) Field of Classification Search
CPC .......... G01N 35/1072; G01N 35/1004; G01N 35/109; G01N 2035/1076; G01N 35/1065;
(Continued)

(56) References Cited

U.S. PATENT DOCUMENTS 5,443,791 A * 8/1995 Cathcart ............ G01N 35/0099
422/65
5,897,837 A  4/1999 Yoshiteru
(Continued)

FOREIGN PATENT DOCUMENTS

DE    4313603 A1  10/1993
EP    2410342 A2   2/2020
(Continued)

*Primary Examiner* — Brian R Gordon
(74) *Attorney, Agent, or Firm* — Dykema Gossett PLLC

(57) ABSTRACT

Various embodiments of the present disclosure are directed to an automatic pipetting system for transferring liquid from dispensing vessels into at least one receiving vessel. In one example embodiment, the system includes a movable pipettor moveable along an x-direction. The pipettor including an arm including two beams and a base structure, and at least one pipetting module. The base structure is movable in the x-direction, and is coupled to the two beams. The two beams oriented parallel to one another and project horizontally in the y-direction. The at least one pipetting module is moveable along each of the two beams in a y-direction and includes at least one hollow needle lowerable in to the dispensing vessels and the receiving vessels. Wherein the at least one pipetting modules move independently past one another on mutually facing longitudinal sides of said beams.

15 Claims, 7 Drawing Sheets

(52) U.S. Cl.
CPC ...... *G01N 35/109* (2013.01); *B01L 2200/026* (2013.01); *B01L 2200/04* (2013.01); *B01L 2200/0605* (2013.01); *B01L 2200/16* (2013.01); *B01L 2300/043* (2013.01); *B01L 2300/0609* (2013.01); *B01L 2300/0829* (2013.01); *B01L 2300/14* (2013.01); *B01L 2400/049* (2013.01); *G01N 2035/1076* (2013.01)

(58) Field of Classification Search
CPC ............... B01L 3/021; B01L 2200/026; B01L 2200/04; B01L 2200/0605; B01L 2200/16; B01L 2300/043; B01L 2300/0609; B01L 2300/0829; B01L 2300/14; B01L 2400/049

See application file for complete search history.

(56) References Cited

U.S. PATENT DOCUMENTS

| | | | |
|---|---|---|---|
| 6,656,724 B1 * | 12/2003 | Heimberg | G01N 35/0099 422/65 |
| 7,998,432 B2 | 8/2011 | Rousseau | |
| 12,097,491 B2 * | 9/2024 | Huemer | G01N 35/1002 |
| 2006/0110287 A1 * | 5/2006 | Kraemer | G01N 35/109 422/63 |
| 2007/0231924 A1 * | 10/2007 | Muraishi | G01N 21/553 435/287.2 |
| 2008/0240898 A1 | 10/2008 | Manz et al. | |
| 2013/0280145 A1 | 10/2013 | West et al. | |
| 2014/0193826 A1 | 7/2014 | Gajewski et al. | |
| 2017/0219614 A1 * | 8/2017 | Cook | G01N 35/1065 |
| 2020/0139360 A1 * | 5/2020 | Limbach | G01N 35/1002 |

FOREIGN PATENT DOCUMENTS

| | | |
|---|---|---|
| WO | 200182013 A1 | 11/2001 |
| WO | 2011119441 A1 | 9/2011 |

\* cited by examiner

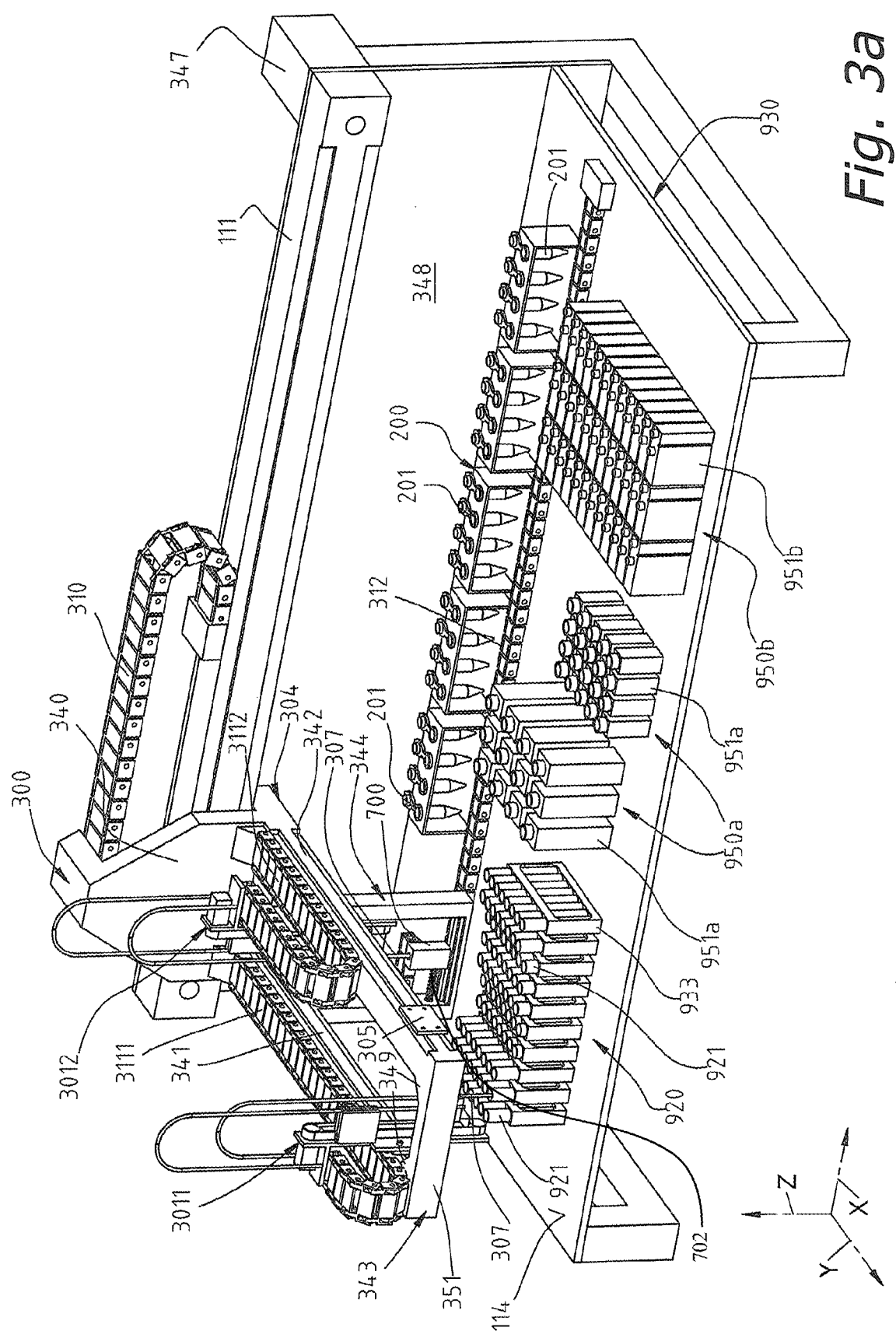

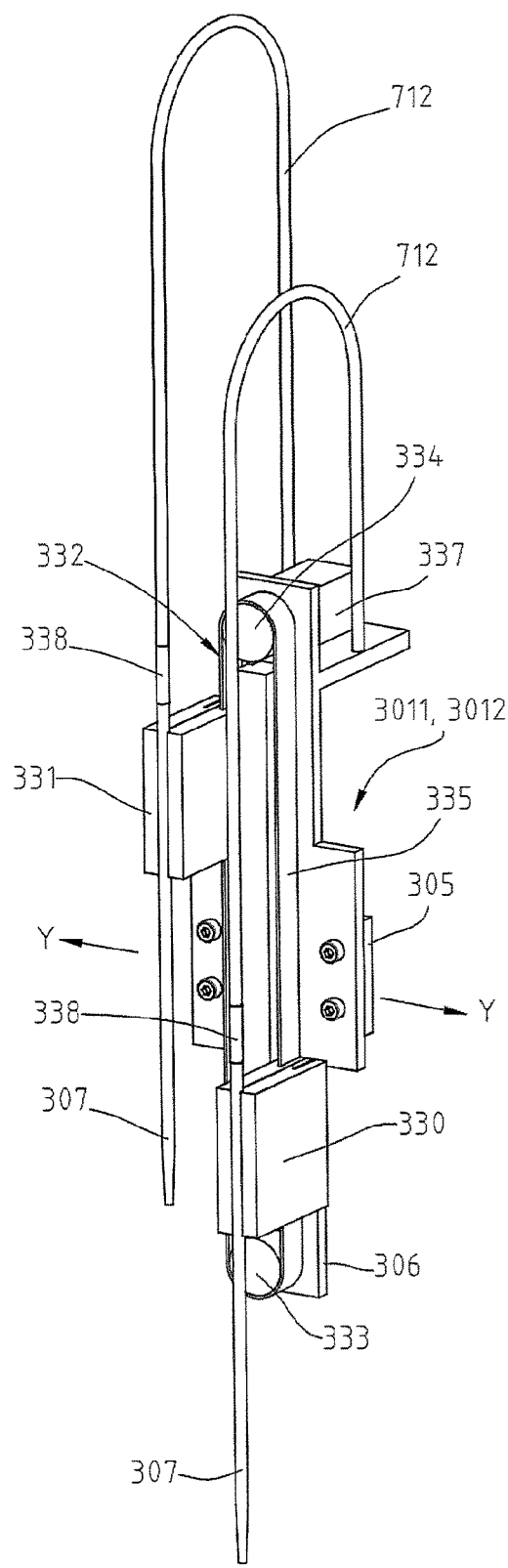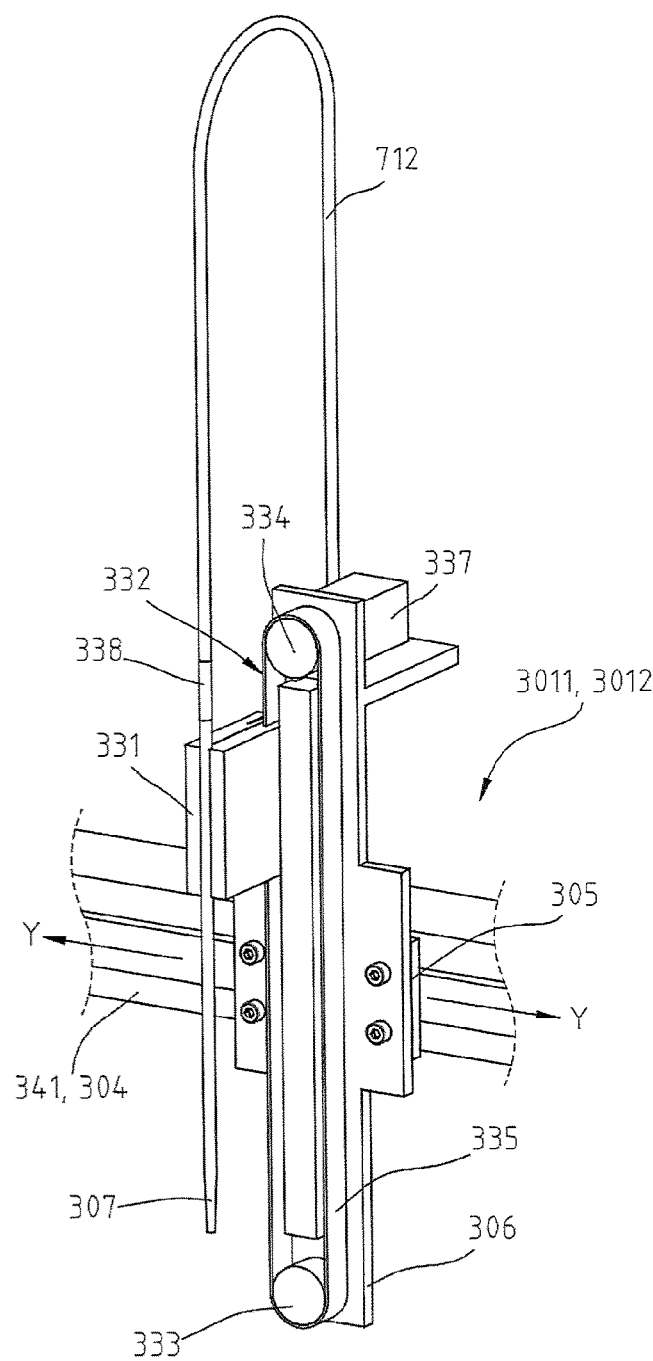
Fig. 3e
Fig. 3f

PIPETTING DEVICE AND METHOD FOR THE TRANSFER OF FLUIDS

CROSS-REFERENCE TO RELATED APPLICATIONS

This application is a national stage filing based upon International application No. PCT/AT2020/060002, filed 3 Jan. 2020, which claims the benefit of priority to Austria application Nos. A 50021/2019, filed 11 Jan. 2019 and A 50250/2019, filed 21 Mar. 2019.

BACKGROUND

The invention relates to an automatic pipetting device for transferring liquids from dispensing vessels, for example from sample vessels and/or reagent vessels, into at least one receiving vessel, wherein a movable pipettor of the pipetting device is designed such as to be movable along a first direction and has at least one pipetting module which is movable along an arm of the pipettor along a second direction, substantially normal to the first direction, and the at least one hollow needle of which is designed to be lowerable into the individual vessels. The invention further relates to a method for transferring liquids from dispensing vessels, for example from sample vessels and/or reagent vessels, into receiving vessels of an automatic pipetting device.

Pipetting machines or pipetting devices for transferring defined quantities of liquid between different liquid vessels distributed in a grid-like manner on a surface are known from the prior art. By way of example, physical, chemical or biological liquid samples may be treated with particular reagents or dilution liquids in the context of preparing a sample for the measurement of chemico-physical parameters that is carried out in an analysis device. Said machines have one or more pipetting units with an associated pipetting needle for taking up and dispensing liquids, these being movable in one or more horizontal directions, relative to the surface on which the liquid vessels are located, and being lowerable into the liquid containers. In addition, needle washing devices are required in order to prevent liquid substance residues which adhere to the needles from being carried over into other vessels. Besides precisely metering the liquid, the construction of the pipetting machines is always aimed at achieving the greatest possible number of pipetting operations per unit of time (high throughput).

In addition, pipetting devices of the type described above are also used in automatic analyzers. Such analyzers are routinely used, for example in clinical diagnostics, analysis and microbiology, the aim being to use chemical and/or biochemical reagents to determine various properties and ingredients of liquid samples quickly, accurately and reproducibly, in particular using optical methods.

For a better understanding of the invention, a few essential technical terms used in the present application will be defined in greater detail:

Pipetting Unit

This refers to the entire system of an automatic pipetting device for transferring liquids between different vessels, which comprises one or more movable pipettors together with all the movable and stationary components necessary for the functioning thereof, including fluidics for supply purposes (hose connections, pumps, valves, containers, etc.), sensors, controller and power supply.

Pipettor

This describes a component of the pipetting unit which is linearly movable horizontally in an x-direction relative to the receiving vessels, sample vessels, reagent vessels, reaction vessels or cuvettes. The pipettor includes a suspended component having at least one pipetting module which is movable in a y-direction, which is substantially normal to the x-direction.

Pipetting Module

This refers to a device which is mounted on the pipettor and which is movable in the y-direction, said device comprising a holder which is movable in the vertical z-direction and which is intended to hold at least one cannula or hollow needle, together with the fluidic connection elements thereof.

Hollow Needle

This refers to a needle or cannula which is mounted on a holder of the pipetting module and which is intended to aspirate liquids from the dispensing vessels and to dispense a metered quantity of the aspirated liquids into the receiving vessels.

Dispensing Vessel

Vessel or container which contains the liquid to be taken up by a hollow needle and transferred into a receiving vessel. Dispensing vessels for storing and providing liquid chemical and biochemical reagents for processing samples and/or for carrying out analyses are also called reagent vessels. Dispensing vessels for providing a liquid sample, in particular an analysis sample from which smaller sample quantities (aliquots) can be taken, are also called sample vessels.

Receiving Vessel

Vessel or container which receives the liquids to be transferred from one or more dispensing vessels by one or more hollow needles. Receiving vessels may be wells of microtiter plates, vials, special reaction vessels and cuvettes for photometric and luminometric measurements.

EP 2 410 342 A2 (HOFFMANN-LA ROCHE) discloses a pipetting device having a pipettor with multiple flat frame elements which are arranged next to one another and which, together with the pipetting needles thereof, are jointly movable on a main frame body in a horizontal x-direction that is normal to the main frame body. The pipetting device serves to transfer samples or reagents from a first row of vessels to a second row of vessels which is offset in the x-direction. The pipetting needles are first adjusted in the y-direction to the spacing of the vessels of the first row in order to take up sample liquid or reagent liquid, and then are adapted to the spacing of the second row of vessels in order to dispense the sample liquid or reagent liquid. However, an independent movement of two pipetting needles in the x- and y-direction is not provided. Movement modules for the y-direction and the z-direction (raising and lowering of the pipetting needles) are arranged in gaps in flat, adjacent frame elements in order to keep the spacing between the individual pipetting needles small. However, an independent movement of the pipetting needles in the y-direction is possible only to a limited extent. For example, it is not possible for the frame elements to move past one another on the transfer arm, which results in a mutual restriction of the freedom of movement of the pipetting needles in the y-direction. Such pipetting devices find a useful application particularly in connection with microtiter plates.

WO 2011/119441 A1 (BIONEX SOLUTIONS) discloses a transfer and testing device for materials, which is equipped with independently movable carrier devices and receiving devices. The carrier devices, which are movable in the X- and Z-direction and which have hollow needles, are arranged in a manner suspended on the underside of a stationary beam construction, which is supported at both ends of the device. The receiving devices are arranged such as to be movable in the Y-direction and rotatable in the X/Y plane and are equipped for example with microtiter plates, into the wells of which sample materials can be transferred. Due to the combined translational and rotational movement of the carrier devices and receiving devices, the travel distances can be minimized.

U.S. Pat. No. 5,897,837 A (TOA MEDICAL) describes an automatic pipetting device or a pipetting machine for pre-treating samples for an immunoassay analyzer. As shown in FIG. 1 of the present application, the pipetting machine 10 has a first pipettor 20 which is movable horizontally in the x- and y-direction and which is equipped with two pipetting needles 11 and 12, it being possible for said pipetting needles to be lowered or raised in the vertical direction independently of one another. In this case, one of the two needles 11 may be assigned to reagents, while the other needle 12 is assigned to samples which are arranged in different sections 14 to 19 of a table plane 23. In addition, a second pipettor 21 is also present, which is movable in the x-y direction and has a lowerable pipetting needle 13.

The first, horizontally movable pipettor 20 carries a needle washing unit 22, which can move back and forth horizontally between the vertical lowering paths of the two pipetting needles 11, 12. In each case, alternately one of the two needles can be being cleaned, while the other needle is carrying out a pipetting process. The two pipetting needles 11, 12 of the first pipettor 20 can be moved only jointly in the x- and/or y-direction.

This has the disadvantage that the weights of the robotics components of the pipettor 20 cannot be distributed across the two horizontal movement axes x and y, so that the weight of the second pipetting unit must always also be accelerated in order to move to positions in the y direction. Likewise, the weight of the needle washing unit 22 together with the needle washing vessel must also always be accelerated in both horizontal directions.

In addition, DE 10 2005 049 920 A1 (MANZ AUTOMATION) discloses a robot assembly for the life sciences field, which comprises a plurality of robot modules 131. As shown in FIG. 2 of the present application, each of the couplable modules 131 is equipped with a stationary X-axis arm 132, on which at least one Y-axis arm 133 is arranged such as to be movable in the X-direction. A coupling device for detachably coupling a work module 134 is provided on the Y-axis arm 133, said coupling device being movable in the Y-direction. The work module 134 may be designed as a pipetting module having a plurality of pipetting needles 135, or else as a gripper module. The samples 136 to be pipetted are arranged on a work deck 137, wherein an interchangeable dispensing module 138 is arranged in a column 139 which connects the work deck 137 to the X-axis arm 132, said dispensing module being connected to the work module 134 via hose lines. According to one embodiment variant, the Y-axis arm 133 may have two coupling devices for work modules 134 on opposite sides of the Y-axis arm 133. The coupling devices are then movable in the Y-direction independently of one another. A plurality of modules 131 can be coupled in such a way that the X-axis arms thereof adjoin one another, wherein the Y-axis arms on neighboring modules can be moved but cannot be moved past one another.

Finally, U.S. Pat. No. 7,998,432 B2 (IMMUNODIAGNOSTIC SYSTEM) discloses an automatic analyzer for carrying out biochemical (clinico-chemical) tests and blood coagulation tests, which are measured by photometry, the analyzer also being suitable for carrying out heterogeneous immunoassays using luminescence detection. The automatic analyzer is divided substantially into an area for storing samples and reagents and an area for carrying out optical measurements and analyses. A pipetting device can move along the two areas and thus can pipette liquid samples and reagents from the storage area into the cuvettes of a measurement area.

SUMMARY OF THE INVENTION

The object of the invention is to considerably shorten the average duration of pipetting processes in a pipetting machine or a pipetting device, and thus to achieve the greatest possible throughput at relatively low cost, particularly in the case of pipetting tasks in which the type and quantity of dispensed reagents and samples constantly change between individual pipetting operations.

This object is achieved according to the invention in that the arm of the movable pipettor has a base structure which is movable in the x-direction and to which two beams are attached, said beams being oriented parallel to one another and projecting horizontally in the y-direction, and pipetting modules, which are each independently able to move past one another, are arranged on the mutually facing longitudinal sides of said beams, each pipetting module having at least one hollow needle which is lowerable into the individual vessels.

The travel distance available on each beam of the pipettor for each pipetting module can be used in full, regardless of the position of the respective other pipetting module.

According to the invention, to increase the torsional rigidity of the arm, the two beams of the arm may be connected at the end remote from the base structure so as to form a frame structure.

According to the invention, by placing the pipetting modules opposite one another it is possible to achieve a smaller spacing of the two hollow needles, wherein the hollow needles of the two pipetting modules which can move past one another preferably have a minimal spacing from one another in the x-direction of 2 mm to 16 mm, preferably 2 mm to 4 mm, as said pipetting modules pass each other. As a result, the two hollow needles can be lowered simultaneously, and without colliding, into a receiving vessel having an opening of 6 mm to 20 mm diameter.

According to one advantageous variant of the invention, the pipettor may have, on the outer side of at least one of the beams, a mount which is movable in the y-direction and which is provided for attaching a working module. Dispensing and receiving vessels of the pipetting device can be transferred or replaced by means of a gripper of the working module.

The following advantages are therefore obtained for the pipetting device according to the invention:

Due to being rigidly suspended on the base structure, the two beams can be moved jointly in the x-direction, i.e. only one drive is required in the x-direction.

The beams are preferably connected on the side opposite the suspended mounting so as to form a frame, in order thus to achieve a maximum mechanical stability (e.g. bending resistance during acceleration or deceleration) with a weight that is as low as possible.

The hollow needles mounted on the mutually facing sides of the two beams can move past one another at a very close spacing (e.g. a minimal spacing of 2 mm in the x-direction). Therefore:

a) Individual travel distances (e.g. between dispensing a sample and subsequently dispensing a reagent from two different hollow needles into one receiving vessel) can be kept as short as possible: positioning the sample-containing hollow needle of the first beam over the opening of a cuvette, first pipetting step; then positioning the reagent-containing hollow needle of the second beam over the cuvette, then second pipetting step. For this, the pipettor need only be moved a very short distance of a few mm in the x-direction, the travel distance of the pipettor corresponding to the spacing between the two hollow needles in the x-direction.

b) The offset movement of a needle washing unit, which moves with the pipettor, between the positions of the hollow needles of the first and second beam can be kept very small (e.g. in the region of 2 mm).

c) According to one variant of the invention, it is also possible to lower the two hollow needles jointly into a vessel having a narrow inlet opening (from 6 mm diameter).

d) The length of the travel rail in the x-direction, including the drive, which is necessary for moving the pipettor across the entirety of a work surface of given edge length in the x-direction, can be much shorter when using hollow needles arranged opposite one another on the inner sides of the two beams than in known embodiments with hollow needles on opposite sides of an arm of equal mechanical rigidity.

The method according to the invention for transferring liquids from dispensing vessels, for example from sample vessels and/or reagent vessels, into receiving vessels of an automatic pipetting device is characterized by the following steps:

1) moving a hollow needle of the pipetting module of the first beam of the pipettor in a travel position across a horizontal work surface to the predetermined x/y-position of the extraction opening of a dispensing vessel;
2) lowering the hollow needle of step 1) into the dispensing vessel, taking up a predetermined quantity of liquid, and raising the hollow needle into the travel position;
3) moving the hollow needle of step 2) across the horizontal work surface to the predetermined x/y-position of the filling opening of a receiving vessel, for example a well of a microtiter plate, a vial, a reaction vessel or a cuvette;
4) lowering the hollow needle of step 3) into the receiving vessel, dispensing a predetermined quantity of liquid, and raising the hollow needle into the travel position; and
5) while steps 1)-4) are being carried out, moving a hollow needle of the pipetting module of the second beam of the pipettor in the y-direction to the receiving opening of a needle washing unit which can move synchronously with the pipettor in the x-direction, regardless of the current position of the hollow needle of the pipetting module of the first beam, or keeping the hollow needle of the pipetting module of the second beam in the travel position.

An increase in throughput is thus achieved as a result of the fact that the two pipetting modules can move past one another unhindered in the y-direction, wherein the first pipetting module is able for example to pipette samples, while at the same time the hollow needle of the second pipetting module is able to be washed, regardless of the position of the first pipetting module.

One embodiment variant of the invention provides that the pipettor of the pipetting device has pipetting modules with different hollow needles which differ in the type of materials used, the internal volumes and/or the geometry of the hollow needles.

For certain pipetting tasks, in which two different types of hollow needles must be used, it may be advantageous if two different hollow needles are used on one and the same pipettor. By way of example, one of the pipetting modules attached to the pipettor may have a particularly small internal volume of the hollow needle in the µl range in order to increase the precision, while the second hollow needle has a correspondingly larger internal volume in order to dispense larger volumes. In another embodiment according to the invention, one of the hollow needles may be made at least in part of a different material (for example of a corrosion-resistant alloy, plastic or steel), or may for example be coated with hydrophobic or hydrophilic substances on the inner and/or outer side of the hollow needle in order to control the wetting. The needles may also differ by other modifications which do not necessarily concern only the surfaces that come into contact with media, such as for example conductive needle components, sensors, heating devices or cooling devices, which are part of the hollow needle or are in contact with the hollow needle. However, the second needle may also differ in terms of its geometry; for example, it may have a different tip angle in order to facilitate the detachment of droplets, or it may have a different length, or a different diameter, in order to better adapt the needle to the pipetting tasks in question.

Thus, by using different pipetting modules which are independently movable in the y-direction on one and the same pipettor, a wide variety of pipetting tasks can be made possible without requiring an additional pipettor or a needle exchange unit.

Regardless of the type of pipetting task, a further increase in throughput is achieved when the pipettor of the pipetting device has at least one needle washing unit for the two pipetting modules, which needle washing unit can move with the pipettor. By way of example, a pipetting process can be carried out with one hollow needle, while at the same time the second hollow needle is being cleaned. The configuration of the pipettor is characterized in that the y-movement of the respective pipetting module is possible without also moving the weight of the needle washing unit carried on the pipettor, as a result of which the two pipetting modules can be accelerated and slowed much faster in the y-direction (in contrast to U.S. Pat. No. 5,897,837 A).

It is particularly advantageous if the movable needle washing unit is arranged on a support structure which is attached to the movable base structure or to at least one of the beams of the arm of the pipettor. However, it is also possible to provide a separate travel rail and drive for the needle washing unit, and to electronically control the exact positioning thereof relative to the movable pipettor. One particular advantage of the needle washing unit moving along on a separate rail is that there is no need for a separate mechanism for bringing the inlet opening of the needle washing unit in the x-direction into the x-position of the respective hollow needles of the two beams. The needle washing unit can swap between the two hollow needles on opposite beams by way of a minor offset movement in the x-direction when following the movement of the pipettor, without any additional actuator having to be provided for this.

The first and the second pipetting module are designed to be movable substantially parallel to one another at least in the region of the two beams of the pipettor.

According to one embodiment variant of the invention, a pipetting module having two jointly movable hollow needles (double needle) is arranged on at least one beam of the pipettor, said hollow needles being connected via a lifting mechanism such that the two hollow needles can be moved in opposite directions (in an antiparallel manner) in the z-direction.

According to one simple embodiment variant, the pipetting modules on the two beams may each have only one hollow needle. Furthermore, a pipetting module having a double needle may be arranged on one beam and a module having a single needle may be arranged on the other beam. Finally, the pipetting modules on both beams may have double needles.

BRIEF DESCRIPTION OF THE DRAWING

The invention will be explained in greater detail below on the basis of partially schematic exemplary embodiments. In the drawings:

FIG. 3a shows an automatic pipetting device according to the invention for transferring liquids from dispensing vessels into at least one receiving vessel, said vessels being arranged on a work surface, in a three-dimensional view;

FIG. 3e shows a detail view of a pipetting module of the automatic pipetting device according to the invention, having a double needle;

FIG. 3f shows a variant of the pipetting module of FIG. 3e, having a single needle;

DETAILED DESCRIPTION

Parts which have the same function are provided with the same reference signs in the individual embodiment variants.

Figure 1:
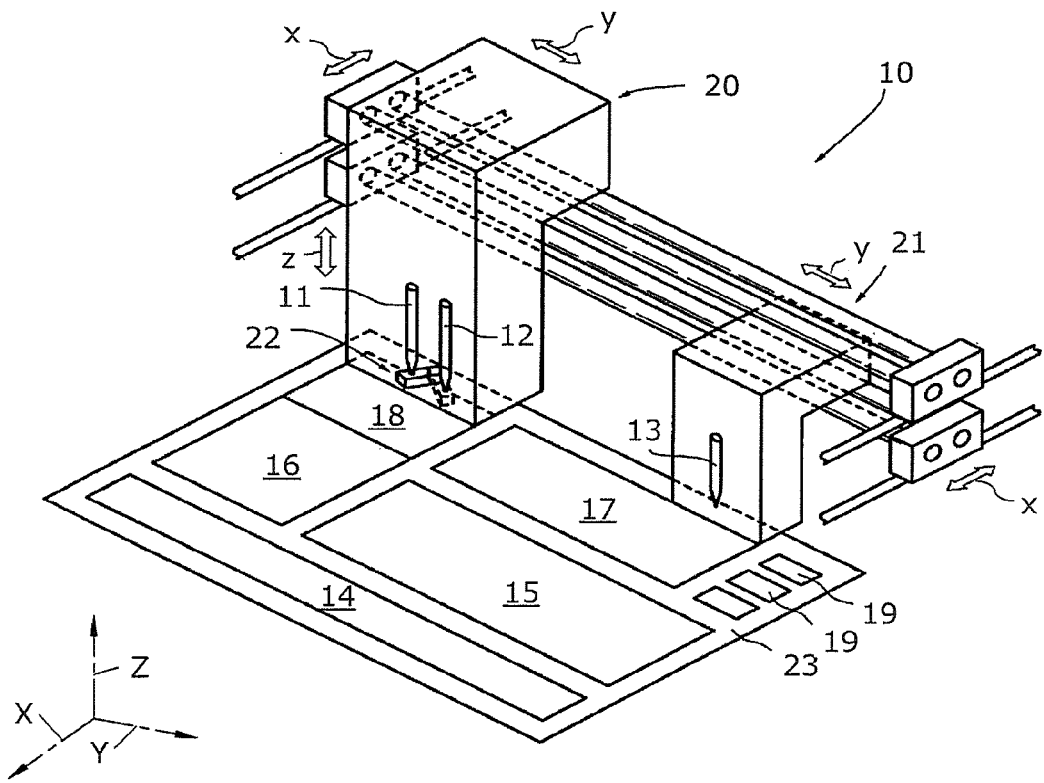
FIG. 1 shows a first automatic pipetting device for transferring samples and reagents according to the prior art, in a three-dimensional view.

The automatic pipetting device shown in FIG. 1 has already been described in detail in the introductory part of the description (see U.S. Pat. No. 5,897,837 A).

Figure 2:
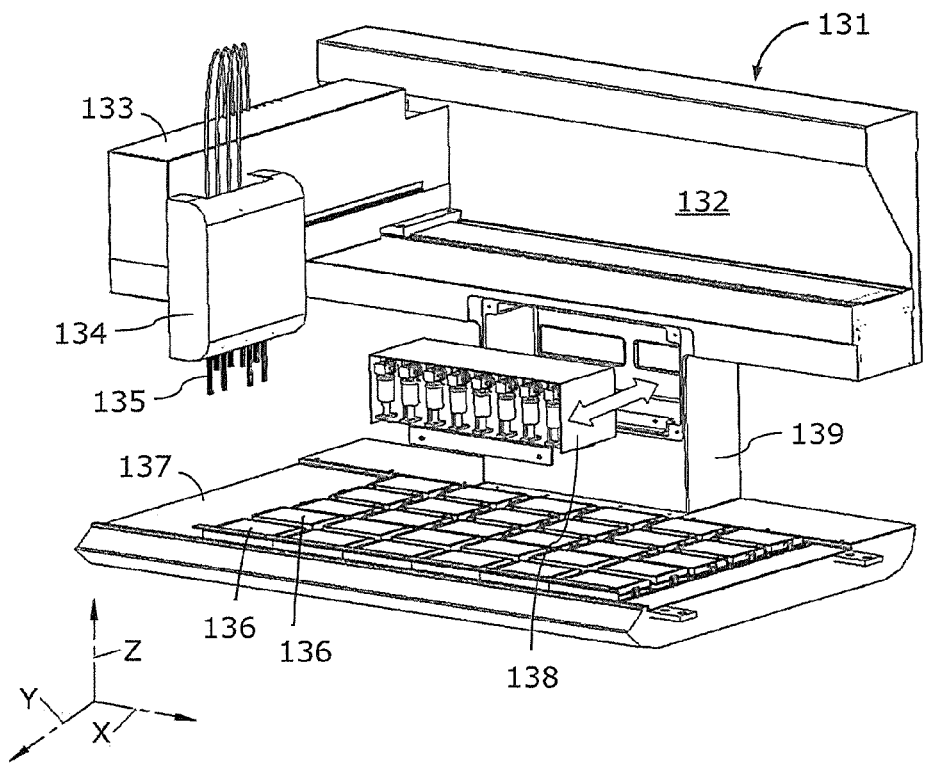
FIG. 2 shows a second automatic pipetting device for transferring samples and reagents according to the prior art, in a three-dimensional view.

The automatic pipetting device shown in FIG. 2 has already been described in detail in the introductory part of the description (see DE 10 2005 049 920 A1).

Figure 3B:
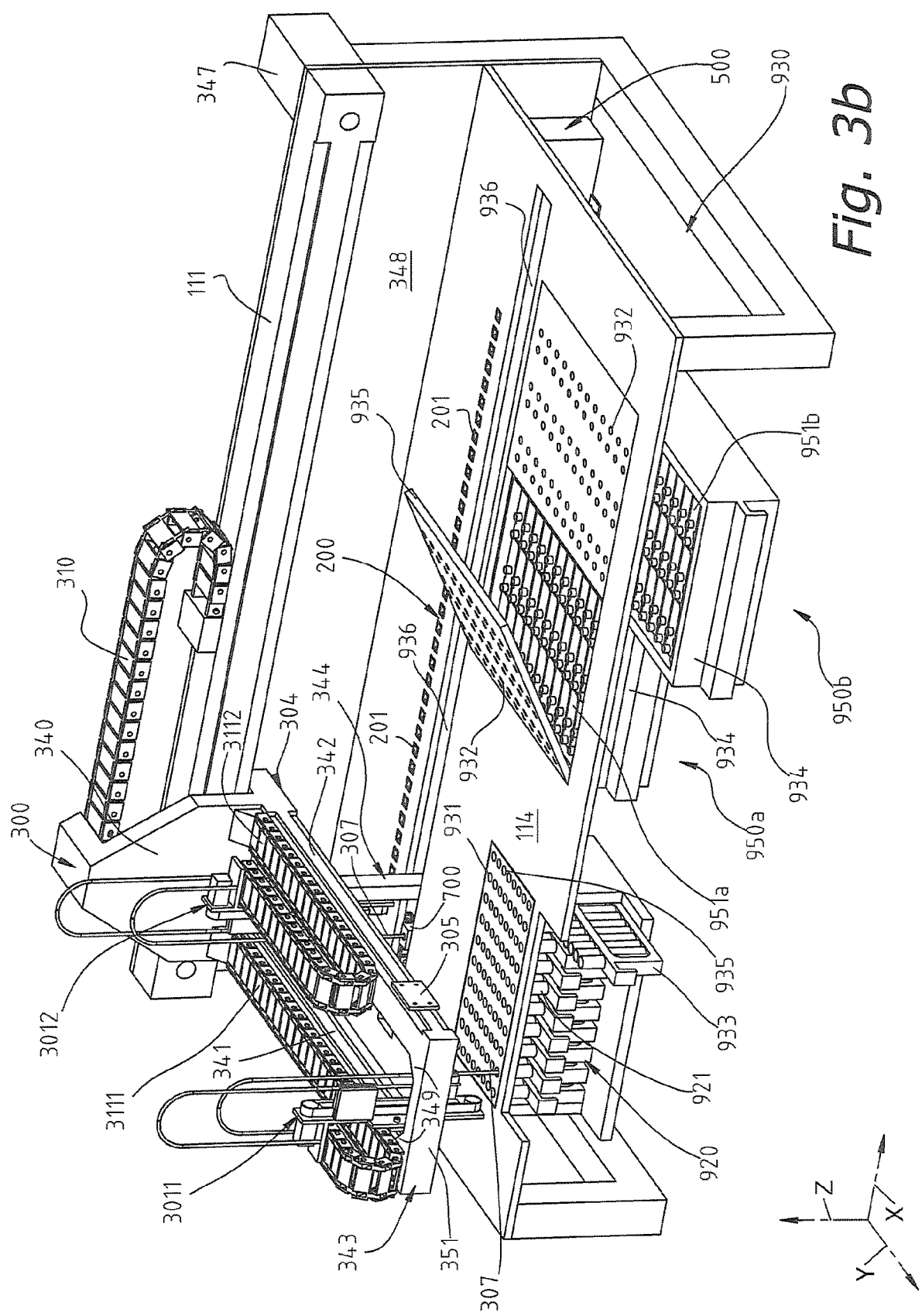
FIG. 3b shows a variant of the automatic pipetting device according to the invention as shown in FIG. 3a, as part of an automatic analyzer, the samples and reagents being arranged below the work surface.

The pipetting device according to the invention, which is shown in FIG. 3a, serves in general for transferring liquids from dispensing vessels into receiving vessels in the context of treating or processing chemical or biological liquids, for example for transferring samples from sample vessels 921, which are present in a sample store 920 on a table surface or work surface 114, and for transferring reagents from various reagent vessels 951a, 951b, which are present in reagent stores 950a, 950b, into at least one receiving vessel 201, for example a vial or a reaction vessel (see FIG. 3a), a cuvette of an analyzer (see FIG. 3b), or a well of a microtiter plate. Multiple receiving vessels 201 may be arranged in a preparation area or measurement area 200, for example in a row as a linear array, or also as a 2D array, for example in the form of a microtiter plate.

In order to simplify the illustration in FIG. 3a and FIG. 3b, only those components of the automatic pipetting device which are essential to the invention are shown, wherein other components of the pipetting device, such as pumps, valves, control units and drive units, which are preferably arranged below the work surface 114 oriented parallel to the x/y plane, will not be discussed in detail here.

The pipetting device shown in FIG. 3a and FIG. 3b has a pipettor 300, which is movable in the x-direction, wherein two pipetting modules 3011, 3012—movable along a y-direction which is substantially normal to the x-direction—are arranged on a horizontally protruding arm 304 of the pipettor 300. The arm 304 of the movable pipettor 300 has a base structure 340, which is movable in the x-direction and to which two beams 341, 342 are attached, said beams being oriented parallel to one another and projecting horizontally in the y-direction. The two pipetting modules 3011, 3012, which are independently able to move past one another, are arranged on the mutually facing longitudinal sides of said beams, each of the pipetting modules 3011, 3012 having at least one hollow needle 307 which is lowerable into the individual vessels 921, 951a, 951b, 201. The two pipetting modules 3011, 3012 are moved in the y-direction by linear drives (for example toothed belt drives), which are not shown here.

The two beams 341, 342 of the pipettor 300 can be connected at the end face of the arm 304 by a connecting web 351 so as to form a substantially rectangular frame structure 343 in order to stiffen the pipettor against deformations in the x-direction. The resulting frame structure can be made even more rigid if stiffening elements 349 are provided on the inner side thereof in each case at the point of intersection between the beam 341 or 342 and the connecting web 351 or the base structure 340 (not shown).

Particularly suitable materials for the arm 304 and the base structure 340 are light metal alloys or fiber composite materials with high tensile strength. The pipettor 300, consisting of the structural features according to the invention, can be manufactured in one or more parts.

Via the base structure 340, which is for example of trapezoidal shape, the arm 304 is suspended on a horizontal running rail 111, which enables the pipettor 300 to move in a longitudinal side of the work surface 114 of a sample and reagent deck 930, said longitudinal side being defined as the x-direction. In the variant shown in FIG. 3a or FIG. 3b, the arm 304 can be moved by a linear drive, for example a toothed belt drive (not shown), which is connected to a servo motor 347. The running rail 111 is anchored to a solid, vertically oriented back plate 348, which is suitable both as a counterweight during the acceleration and deceleration of the pipettor 300 and also for cooling the running rail 111. In one typical embodiment according to the invention, the back plate 348 may be made of aluminum and may have a weight of 20 kg; the machine frame (not shown in detail) below the work surface 114 may have a weight of >300 kg.

For guiding fluidic lines and any electrical power supply lines and signal lines in the y-direction, the two pipetting modules 3011 and 3012, which are movable on the inner side of the beams 341, 342, have energy chains 3111, 3112 which can be unrolled on the respective beam upper side. For guiding the lines in the x-direction, an energy chain 310 which can be unrolled on the running rail 111 is provided for this purpose.

The pipettor 300 of the pipetting device has a needle washing unit 700, which is movable with the pipettor 300, for washing the respective two hollow needles 307 of the two pipetting modules 3011 and 3012.

The needle washing unit 700 is carried along on a hanging support structure 344 on the pipettor 300, wherein an actuator, for example in the form of a spindle drive acting in the x-direction together with a drive unit 346 (see FIG. 3*d*), makes it possible to change the position of the needle washing unit 700 on the support structure 344 so that the hollow needles 307 of both pipetting modules 3011 and 3012, which are movable in the y-direction, can be washed using a single needle washing unit 700. In addition, a possibility for changing the x-position of the needle washing unit 700 can also be provided by virtue of suspension on a horizontally pivotable boom of a rotary actuator 702. As shown in FIG. 3*a* and FIG. 3*b*, the support structure 344 can be rigidly connected to the arm 304 or to the base structure 340.

A separate energy chain 312 may be provided for guiding fluidic lines and any electrical power supply lines and signal lines of the needle washing unit 700 in the x-direction. However, it is also possible for these lines to be carried along in the unrollable energy chain 310 of the pipettor 300.

According to one embodiment variant, it is also possible for a separate needle washing unit 700 to be provided for each of the two pipetting modules 3011 and 3012, each of said needle washing units being fixedly assigned to one of the pipetting modules 3011 or 3012.

According to another advantageous embodiment variant, a single needle washing unit 700 may be fixedly arranged on the support structure 344 exactly in the middle between the hollow needles 307 of the two pipetting modules 3011 and 3012 that are to be washed, wherein the opening of the needle washing unit 700 may be designed for example as a slot (see FIG. 4*b*) so that the hollow needles 307 of the pipetting modules 3011 and 3012, which are movable opposite one another on the inner side of the beams 341, 342 at a small spacing in the x-direction, can be lowered into the opening of the needle washing unit 700 one after the other, or even simultaneously. In this variant, there is advantageously no need for an actuator for moving or pivoting the needle washing unit.

Instead of a needle washing unit 700 being carried along on the pipettor 300, said needle washing unit may also be guided behind the latter in an electronically controlled manner across the entire movement range of the arm 302 of the pipettor 300. In this case, an additional travel rail must be provided, together with a horizontal linear drive in the x-direction, such as a toothed belt drive for example. One advantage of this is that the weight of the needle washing unit 700 together with its power supply lines need not be moved on the pipettor 300.

The pipettor 300 of the pipetting device according to the invention may advantageously have, on the outer side of at least one of the beams 341, 342, a mount 305 for attaching a work module (not shown), said mount being movable in the y-direction. The work module may comprise a gripper for transferring or exchanging vessels (for example microtiter plates or cuvettes). The movement of the work module may for example be coupled, via a suitable entrainment mechanism, to the movement of a pipetting module 3011 or 3012 moving on the opposite side of the relevant beam 341, 342. The work module may optionally be fixed to the mount 305 shown in FIG. 3*a* or FIG. 3*b*, or may be moved along on a lateral extension (not shown here) of one of the pipetting modules 3011 or 3012. The power supply lines of the gripper can then be carried along very easily on one of the two energy chains 3111 or 3112 together with the power supply lines of the adjacent pipetting module 3011 or 3012.

When using the pipetting device according to the invention in an automatic analyzer for analyzing biological or chemical samples by means of optical measurements in cuvettes 201 (see FIG. 3*b*), the gripper of the work module can be used to transfer cuvettes from a cuvette store to an optical measurement unit 500 or to a cuvette disposal container (not shown).

FIG. 3*b* shows a variant of an automatic pipetting device according to the invention as shown in FIG. 3*a*, as part of an automatic analyzer for analyzing liquid biological/chemical samples. The device configuration shown in FIG. 3*b* is designed for transferring, by using the two pipetting modules 3011, 3012 which can be moved across the work surface 114, liquid samples and reagents from the sample and reagent stores 920 and 950*a,b* of a sample and reagent deck 930 of the analyzer into the cuvettes 201 arranged in a measurement area 200 of an optical measurement unit 500, in which the reaction mixtures containing the analytes to be determined can be analyzed using optical methods (photometry or luminometry). The work surface 114, which serves as a cover, is arranged closely above the top edges of the sample vessels 921 and reagent vessels 951*a*, 951*b* and receiving vessels 201 (cuvettes). The unhindered movement of the needle washing unit 700 on its support structure 344 along the x-axis is ensured by the slot-shaped opening 936 in the work surface 114, which is shown in FIG. 3*b*.

In order to make it easier to maintain and populate the aforementioned storage areas 920 and 950*a,b*, these are arranged on a front longitudinal side of the analyzer, the sample store 920 having strip-shaped racks 933 which can be manually inserted by the user into the respective storage slots below a cover 935 having the through-openings 931 for the hollow needles 307.

The reagent stores 950*a*, 950*b* with the reagent containers 951*a*, 951*b* held therein can be manually swapped from above for example, as shown in FIG. 3*b*, after folding to the side a cover 935 that has through-openings 932 for the hollow needles 307 of the pipetting modules 3111, 3112. For easy, manual removal of the reagent containers 951*a*, 951*b*, it is particularly advantageous if the reagent containers are stored in cassettes 934 which can be pulled out toward the front.

Figure 3C:
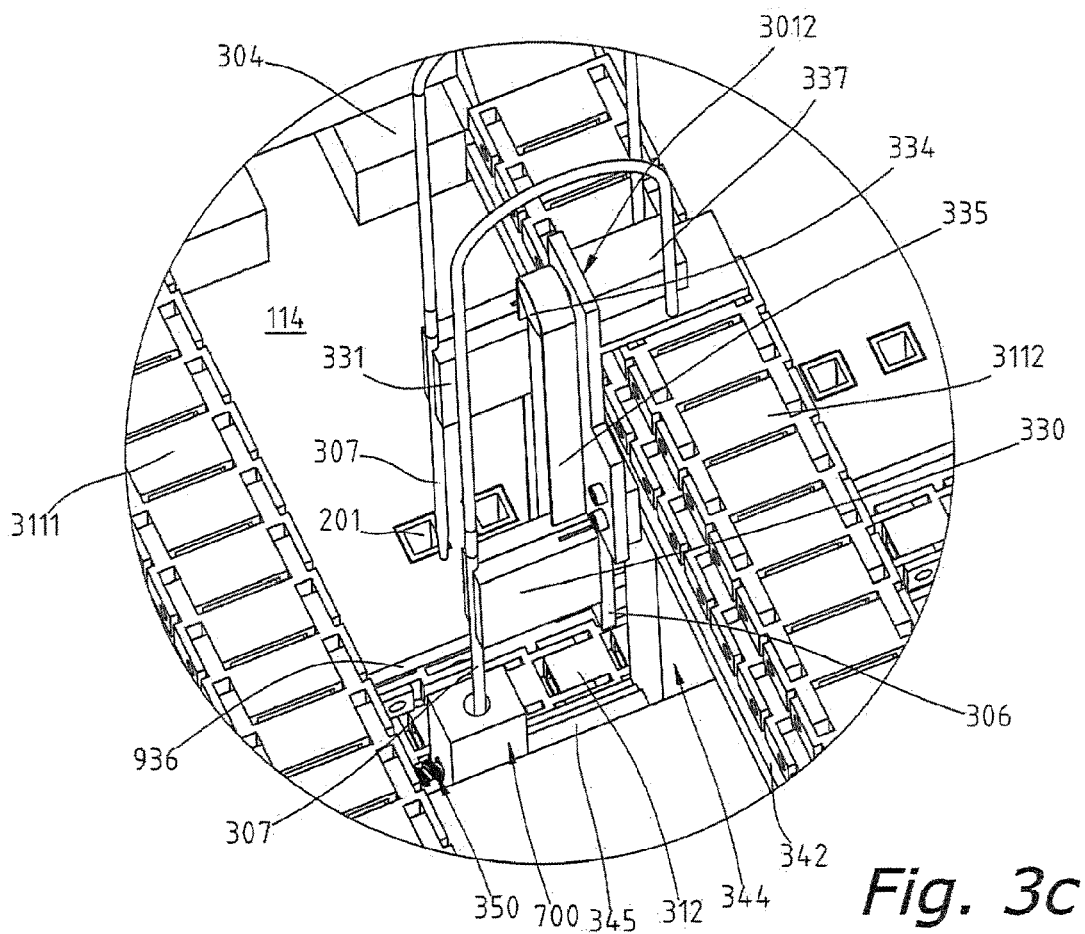
FIG. 3c shows an enlarged detail view of the pipetting device of FIG. 3b in the region of the needle washing unit.

FIG. 3*c* shows an enlarged detail view of the pipetting device of FIG. 3*b*, looking toward an inner side of the beam 342, wherein, of the two movable pipetting modules 3011, 3012, the pipetting module 3012 arranged in the region of the needle washing unit 700 is visible. The illustration in FIG. 3c shows the pipetting module 3012 with a vertical toothed belt 335, to which two needle holders 330, 331 are clamped, each holding at least one hollow needle 307.

Figure 3D:
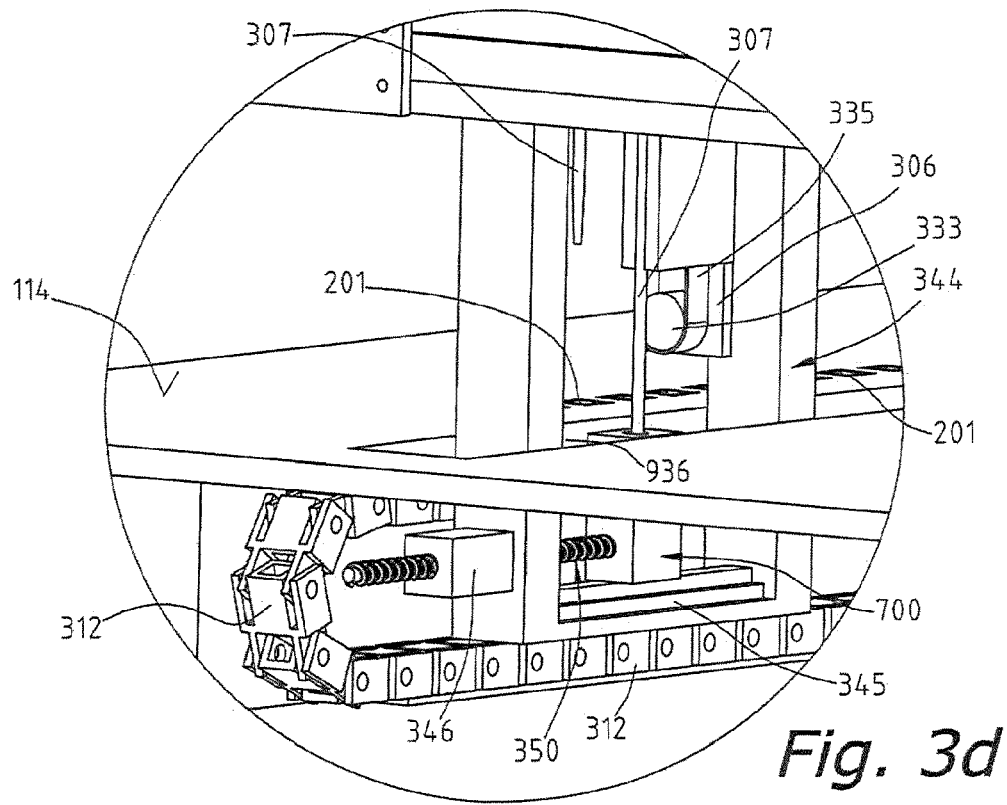
FIG. 3d shows the detail view of FIG. 3c at a different viewing angle.

The illustrations in FIG. 3c and FIG. 3d show the needle washing unit 700 together with a hollow needle 307 lowered therein for washing, wherein the power supply lines can be routed to the needle washing unit 700 over a particularly short distance if the power supply lines are guided not by the energy chain 310 or parts of the pipettor 300, but rather by a separate energy chain 312 which unrolls in the x-direction.

The lifting mechanism 332 shown by way of example in FIG. 3e and FIG. 3f has a toothed belt 335 clamped vertically between a lower pulley 333 and an upper pulley 334 serving as a drive wheel, said toothed belt being suitable for moving a needle holder 330 or 331, clamped thereto, together with a hollow needle 307, in the z-direction on a downwardly projecting and vertically oriented rail section 306. The individual hollow needles 307 of the pipetting modules 3011, 3012 located opposite one another in the x-direction are thereby clamped at the edge in the needle holders 330 or 331 such that the hollow needles 307 can move past one another at a small spacing as the pipetting modules pass each other.

It is particularly advantageous if the hollow needles 307, which come close to one another, have a minimal spacing from one another in the x-direction of 2 mm to 16 mm, preferably 2 mm to 4 mm as they pass each other in the y-direction, so as to be able to be lowered simultaneously, and without colliding, into a receiving vessel 201 having an opening of 6 mm to 20 mm diameter.

Figure 5:
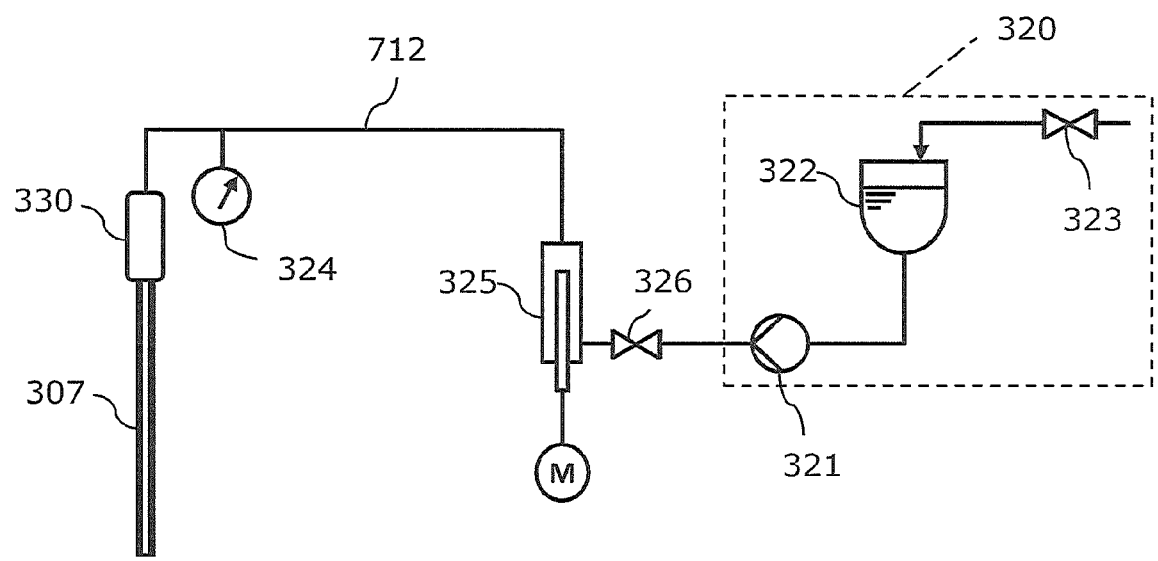
FIG. 5 shows fluidic elements of a pipetting module of FIG. 3a or FIG. 3b, in a schematic illustration.

Each hollow needle 307 is connected at the upper end, via a connecting piece 338 and by the flexible pressure transfer channel 712, to the fluidics as shown in FIG. 5, by which the pressure in the hollow needle 307 can be varied accordingly for aspirating and dispensing liquids.

According to the embodiment variant of a pipetting module 3011 and 3012 shown in FIG. 3e, two hollow needles 307 are arranged on the lifting mechanism 332 such as to be movable in opposite directions or in an antiparallel manner in the z-direction, since the needle holders 330, 331 thereof act on opposite runs of the toothed belt 335. Furthermore, instead of a revolving toothed belt, other mechanical elements can also be used, provided that these act in the same way. By way of example, racks which are oriented vertically on both sides may act on the pulley or drive wheel 334, each of said racks having a needle holder 330 or 331.

According to the embodiment variant of a pipetting module 3011 or 3012 shown in FIG. 3f, which can be attached to the beam 341 of the arm 304 on a mount 305 which is movable in the y-direction, said pipetting module carries a single hollow needle 307 which is vertically movable via a lifting mechanism 332.

A further advantageous embodiment variant of the pipetting device may have pipetting modules 3011 or 3012 which comprise a plurality of lifting mechanisms of the type shown in the exemplary embodiments in FIG. 3e and/or FIG. 3f, arranged next to one another in the y-direction, so as to be able to move a plurality of hollow needles 307 independently of one another in the z-direction on a beam 341 or 342.

By arranging two lifting mechanisms 332 next to one another (not shown), different variants of a pipetting module 3011 or 3012 can be implemented, each having a total of two, three or four hollow needles 307, it also being possible for the number of lifting mechanisms combined to form a pipetting module to be greater than two, depending on the task. In this way, a greater number of hollow needles 307 can be provided for different pipetting tasks or, if the proportion of lifting mechanisms which each have only one hollow needle 307 is increased (FIG. 3f), a greater number of hollow needles 307 which are independently movable in the z-direction can be provided.

All the hollow needles 307 of the pipettor 300 may be made of different materials and/or may have different internal volumes, and therefore are available for different tasks.

Design Example and Exemplary Key Performance Indicators of a Pipetting Device According to the Invention The maximum travel time defined in a typical application of the pipetting device according to the invention for a complete diagonal movement of a pipetting module 3011, 3012 of the pipettor 300 across a work surface 114 measuring 1 m×0.5 m is <500 ms.

Said maximum travel time is particularly important in an automatic analyzer as shown in FIG. 3b, which has the aforementioned dimensions of the work surface and has to achieve a particularly high throughput of pipetting and gripping operations at typically randomly distributed, non-adjacent receiving and dispensing positions.

The acceleration that can be measured on the structure of the pipettor 300 during the movement in the x-direction is >17 m/s2, with an instantaneous velocity of 3.6 m/s being achieved. The weight of the arm 304, when typically made of an aluminum alloy, is approximately 5 kg, a transverse force in the x-direction of >85 N being measured on the connecting web 351 of the frame structure 343 of the arm 304 when accelerating. Despite the high transverse forces, it is necessary to prevent bending deflections >0.5 mm or vibration/bouncing of the arm 304 with its pipetting modules 3011, 3012 since this may lead to errors in pipetting, for example due to a loss of liquid when moving horizontally (or to unwanted contact with the wall of approached liquid containers when subsequently lowering the hollow needles 307). Furthermore, vibration damage may occur to the entrained electronics of the pipetting modules 3011, 3012, for example to the bond wire contacting of integrated circuits of fill level and/or pressure measuring systems.

The servo motor 347 of the pipettor 300 has an output of >0.8 kW so as to ensure the kinematic power values of the pipettor desired during operation when moving in the x-direction of the work surface.

Figure 4A:
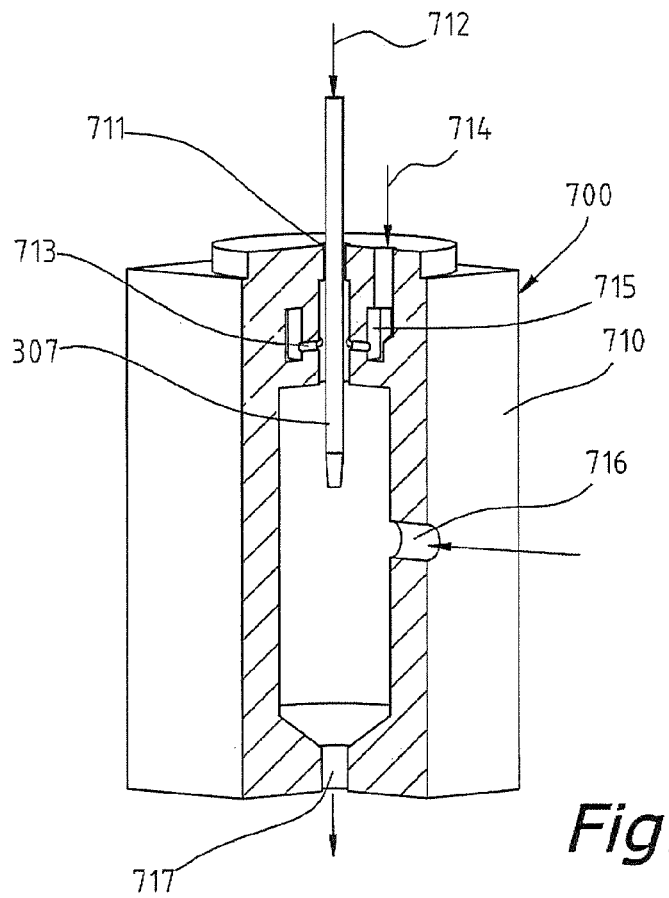
FIG. 4a shows a needle washing unit of the automatic pipetting device of FIG. 3a to FIG. 3d, in an enlarged sectional illustration.

FIG. 4a shows, in an enlarged sectional illustration, the structure of a needle washing unit which is labeled with the reference sign 700 and which is arranged on the base structure 340 or on the arm 304, said needle washing unit receiving a hollow needle 307 of the pipetting modules 3011, 3012, which are shown at different positions in FIG. 3a and FIG. 3b. The hollow needle 307 is introduced through a receiving opening 711 in the housing 710 of the needle washing unit 700, wherein simultaneously the lumen of the needle is cleaned using a washing solution or the system liquid from the pressure transfer channel 712 and the outer side of the needle is cleaned using a rinsing liquid 714 which is supplied from an annular chamber 715 via lateral cleaning nozzles 713. In order to clean the inside and the outside of the hollow needle 307 by repeatedly aspirating and discharging washing solution from the lower part of the needle washing unit, washing solution may be supplied through a radial inlet 716 and can then be emptied through an extraction opening 717.

Figure 4B:
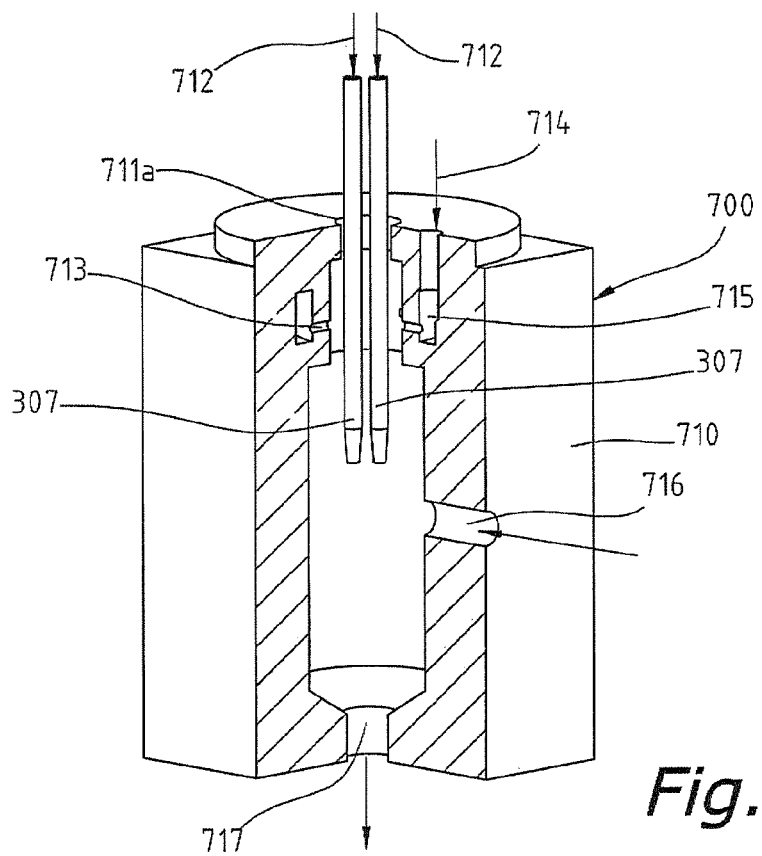
FIG. 4b shows a variant of the needle washing unit of FIG. 4a for receiving two hollow needles simultaneously.

The embodiment variant of the needle washing unit shown in FIG. 4b differs from that shown in FIG. 4a substantially by a receiving opening 711a which is designed as a slot and can receive and which is able to clean two hollow needles 307 simultaneously.

FIG. 5 shows the fluidic circuit diagram of a hollow needle 307, which is connected, via a pressure transfer channel 712 filled with a degassed liquid, to a precision piston pump 325, preferably a positive displacement pump (diluter) which is driven by a stepper motor. The positive displacement pump has an additional liquid connection on the side, which is connected via a solenoid valve 326 to a supply unit 320 for a system liquid, which conveys for example degassed, deionized water via a rinsing pump 321 from a storage vessel 322 that can be refilled or pressurized via a solenoid valve 323.

In order to detect faults, the pressure transfer channel 712 has, in the vicinity of the pipetting needle 301, a further connection to a pressure sensor 324, which is connected to an evaluation and monitoring unit (not shown here), for example in order to detect blockages of the hollow needle 307.

Description of a Pipetting Process

In order to transfer a defined quantity of liquid, for example using a pipetting module 3011 as shown in FIG. 3a, the latter is first moved in the horizontal direction to a dispensing vessel (for example sample vessel 921), 5 μl of air (spacer) is aspirated into the tip of the hollow needle 307, and the hollow needle 307 is lowered in the direction of the liquid surface of the first vessel 921. In order to ensure a sufficient, but not excessive, depth of immersion of the hollow needle 307, the downward movement of the hollow needle 307 is stopped at a defined depth of immersion by a signal from a liquid surface detection device (not shown), for example using a capacitive detection principle. In order to aspirate a defined quantity of liquid with high accuracy in the μl range, a negative pressure is then generated in the hollow needle 307 of the pipetting module 3011 by moving the working piston of the positive displacement pump (diluter) shown in FIG. 5 in the downward direction, which causes a corresponding volume of liquid to be aspirated from a first vessel. The pipetting module 3011 is then moved together with the aspirated liquid, which is separated from the system liquid by a separating air bubble (spacer), to a second vessel (for example receiving vessel 201), wherein the process then takes place in reverse and the aspirated liquid is dispensed through the tip of the hollow needle 307 into the second vessel. At least between two pipetting processes involving different liquids to be pipetted, an internal and external cleaning of the hollow needle 307 always takes place in the needle washing unit 700. During the pipetting process using the pipetting module 3011, the hollow needle 307 of the second pipetting module 3012 can be being cleaned and dried in the needle washing unit 700.

Figure 6:
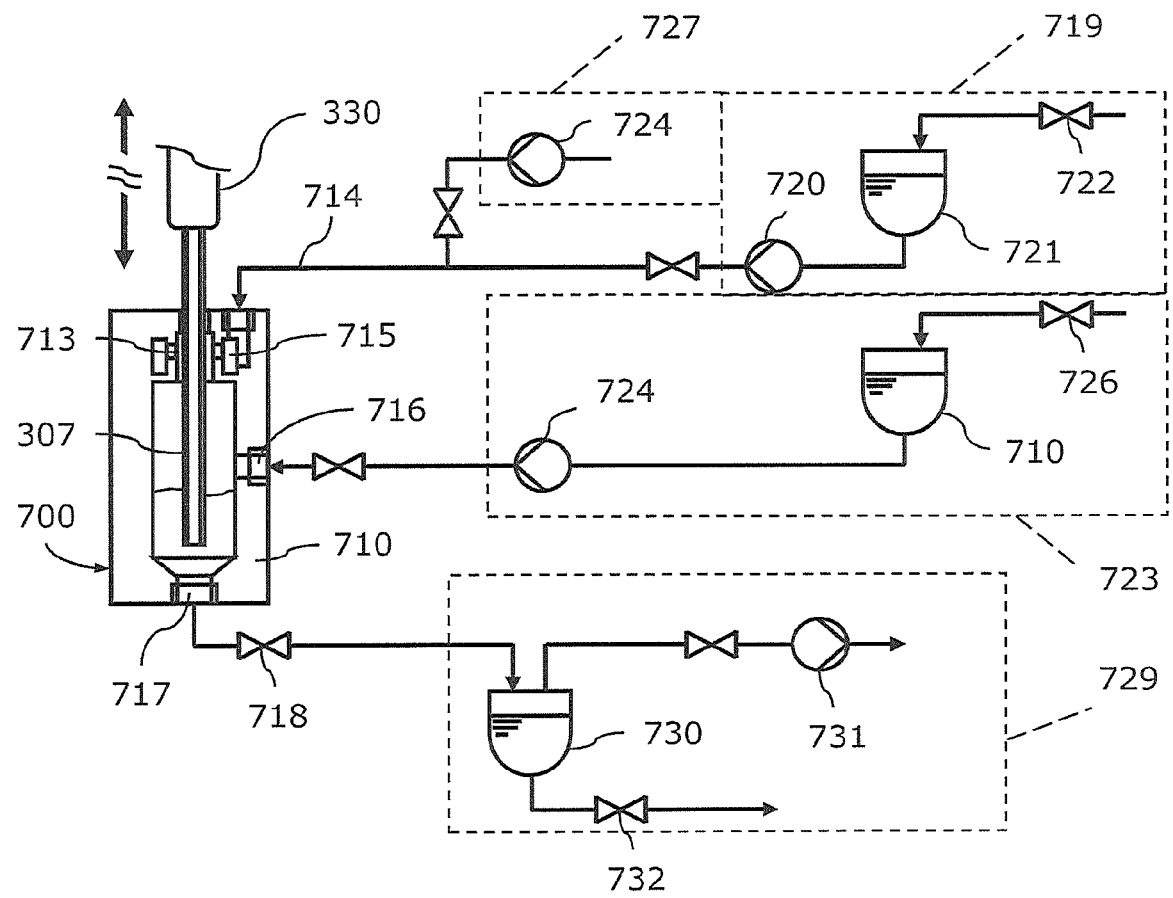
FIG. 6 shows fluidic elements of the needle washing unit of FIG. 4a, in a schematic illustration.

FIG. 6 shows the fluidic circuit diagram of a needle washing unit 700 according to FIG. 4a, with the hollow needle 307 lowered therein. The housing 710 of the needle washing unit has in the upper region a concentrically extending annular chamber 715, which acts as a media supply for a plurality of inner, concentrically oriented cleaning nozzles 713 and which is connected via respective solenoid valves to a supply unit 719 for a rinsing liquid (for example deionized water) and a supply unit 727 for dry air.

An inlet 716 arranged radially at mid-height of the housing 710 of the needle washing unit 700 is likewise connected to a solenoid valve and serves solely for supplying surfactant-containing washing solution from a supply unit 723.

The supply units 719 for a rinsing liquid and 723 for a washing solution each have a pump 720, 724 which conveys rinsing liquid or a surfactant-containing washing solution from the respective storage containers 721, 725, which can each be refilled or pressurized via a solenoid valve 722, 726. The supply unit 727 for air has an air pump 728 for supplying compressed air and optionally a drying means (not shown).

The extraction opening 717 located at the bottom of the needle washing unit 700 is connected via a solenoid valve 718 to the wastewater collection unit 729, which is under a vacuum and substantially consists of a collecting container 730 which has in the gas space above the liquid a connection to a vacuum pump 731, which is connected to the collecting container 730 via a solenoid valve. The wastewater collected can be discharged via a solenoid valve 732 at the bottom of the collecting container 730 and can be fed to a further wastewater treatment.

Description of a Needle Washing Process

In a typical process for washing a hollow needle 307 of the pipetting modules 3011, 3012, said needle is first moved horizontally to the needle washing unit 700 and is lowered into the lower holding position of the washing chamber. All the wastewater that is produced when cleaning the hollow needle 307 is sucked away via the extraction opening 717 located at the bottom, is collected, and is optionally subjected to an aftertreatment. Residual amounts of the last-pipetted liquid which are located in and on the needle tip are then emptied and sucked away via the precision piston pump 325, which is shown in FIG. 5. Finally, the lowered hollow needle 307 is rinsed from behind by means of the supply unit 320 for system liquid, which is shown in FIG. 5.

In a next step (with the solenoid valve 718 at the extraction opening 717 closed), a defined volume of surfactant-containing washing solution is introduced through the inlet 716 in the housing 710 of the needle washing unit 700, as a result of which the chamber in the lower part fills with a defined level of washing solution. The hollow needle 307 is lowered so far until an external wetting of the needle can take place by immersion in the washing solution and an internal wetting of the hollow needle 307 can take place as a result of the washing solution being aspirated into the needle interior. The aspirated washing solution is then discharged again, it being possible for the process of aspirating and discharging the washing solution to be repeated multiple times in order to improve the cleaning effect.

In a last step, the contaminated washing solution is sucked away and the interior of the hollow needle 307 is rinsed with system water (for example degassed, deionized water), while the outer side of the hollow needle 307 is at the same time rinsed with rinsing liquid from the supply unit 719 by the concentrically arranged cleaning nozzles 713 located at the top, the tip of the hollow needle 307 being moved upward from the bottom in order to improve the cleaning effect.

Once the simultaneous rinsing of the inside and the outside is complete, the hollow needle 307 is moved back into the lower holding position, the media supply to the cleaning nozzles 713 is switched to the supply unit 727 for compressed air, and the tip of the hollow needle 307 again moves upward from the bottom, as a result of which adhering water droplets can quickly be removed from the needle surface. The hollow needle 307 can then be moved out of the needle washing unit 700 and is again ready for pipetting.

EXAMPLES

The automatic pipetting device shown in FIG. 3a and FIG. 3b operates for example as follows:

Prior to a pipetting task, the control unit (not shown) of the pipetting device brings together, from known and previously input information, all the data required for transferring the liquids (for example samples, reagents and other liquids) in the form of a transfer protocol.

Starting from a specified analysis protocol for a particular analysis to be carried out on a sample using two reagents, the transfer protocol includes for example all the instructions for transferring a liquid sample (located in a sample vessel 921 in a sample store 920) and for transferring a first and a second liquid reagent (stored in two reagent vessels 951a, 951b in a reagent store 950a, 950b), the x/y-positions of the extraction openings of the sample vessel 921 and of the two reagent vessels 951a, 951b, the x/y-position of the filling opening of a free receiving vessel 201, and the liquids and quantities of liquid to be transferred over time.

For the sake of simplicity, it is assumed in the following examples that the first pipetting module 3011 on the first beam 341 and the second pipetting module 3012 on the second beam 342 each carry only one hollow needle 307. If they carry multiple hollow needles, the control unit will in each case select a suitable hollow needle with regard to transfer volume and needle material.

In order to move in the x- and/or y-direction of the work surface, all the hollow needles 307 must always be located in a travel position in the z-direction, or must be brought into said position. The travel position is selected such that, as the pipettor 300 moves, all the hollow needles can move across the work surface without colliding. In the lifting mechanism of the double-needle variant, this is the position in the z-direction at which both hollow needles 330, 331 are at the same height. The exception is the hollow needle immersed in a needle washing unit 700.

Example 1

The steps set out below relate to an exemplary transfer protocol for sample processing and/or analysis that is to be carried out on a liquid sample using two liquid reagents. In this case, the sample should be present in a sample vessel 921 in the sample store 920. The first reagent should be present in a first reagent vessel 951a in a first reagent store 950a. The second reagent should be present in a second reagent vessel 951b in a second reagent store 950b. Quantities of sample, first reagent and second reagent specified by the analysis protocol should be introduced in sequential order into a receiving vessel 201, which is located in a preparation or measurement area 200.

In step 1, the hollow needle 307 of the first pipetting module 3011 is brought into the x/y-position of the opening of the sample vessel 921 selected by the control unit by simultaneously moving the pipettor 300 in the horizontal x-direction and the first pipetting module 3011 in the horizontal y-direction.

In step 2, the hollow needle 307 positioned in step 1 is lowered in the z-direction into the sample vessel 921, so that the tip of said hollow needle is immersed in the sample liquid, after which a quantity of sample liquid specified by the control device is aspirated into the lowered hollow needle, and subsequently the hollow needle is raised again in the z-direction into the travel position.

In step 3, the hollow needle 307 filled with sample liquid in step 2 is brought into the x/y-position of the filling opening of the receiving vessel 201 selected by the control unit, for example a reaction vessel 201 in FIG. 3a or a cuvette 201 in FIG. 3b, by simultaneously moving the pipettor 300 in the horizontal x-direction and the first pipetting module 3011 in the horizontal y-direction.

In step 4, the hollow needle filled with sample liquid in step 2 is lowered in the z-direction into the receiving vessel 201, thereby dispensing a predetermined quantity of sample liquid, and then is raised again in the z-direction into the travel position.

During all the actions of the hollow needle 307 of the first pipetting module 3011 described above in steps 1-4, the hollow needle 307 of the second pipetting module 3012, regardless of the current position of the hollow needle of the first pipetting module 3011, either may remain in the travel position or may move in the y-direction into the y-position of the inlet opening of a needle washing unit 700 moving synchronously with the pipettor 300 in the x-direction, may be cleaned therein after lowering the needle tip, and then may be raised again into the travel position.

Further steps 5-8 are analogous to steps 1-4, with the difference that now the hollow needle 307 of the second pipetting module 3012 transfers reagent liquid from a dispensing vessel 951a into the receiving vessel 201, while the hollow needle 307 of the first pipetting module 3011 is being washed.

Subsequent steps 9-12 are analogous to steps 5-8, with the difference that now the hollow needle 307 of the first pipetting module 3011 transfers a second reagent liquid from a dispensing vessel 951b into the receiving vessel 201, while the hollow needle 307 of the second pipetting module 3012 is being washed.

In the variant according to Example 1, therefore, a pipetting needle of one of the two pipetting modules 3011, 3012 can be pipetting samples and reagents while a pipetting needle of the respective other pipetting module is being washed and/or held ready in the travel position.

Example 2

The steps set out in Example 2 relate to an exemplary transfer protocol for sample processing and/or analysis that is to be carried out on a first liquid, for example a sample liquid, using a second liquid, for example a reagent liquid. In this case, the first liquid, for example the sample liquid, should be present in a sample vessel 921 of the sample store 920. The second liquid, for example the reagent liquid, should be present in a first reagent vessel 951a of the first reagent store 950a. Quantities of first and second liquid (sample and reagent) specified by the analysis protocol should be introduced in sequential order into a receiving vessel 201, which is located in a preparation or measurement area 200.

In the following, the first liquid is a sample liquid and the second liquid is a reagent liquid. However, other constellations are also conceivable; for example, the first liquid may be a sample liquid, a reagent or an active ingredient, and the second liquid may be a dilution liquid. The first and the second liquid may also be different reagents.

In step 1, the hollow needle 307 of the first pipetting module 3011 is brought into the x/y-position of the opening of the sample vessel 921 selected by the control unit by simultaneously moving the pipettor 300 in the horizontal x-direction and the first pipetting module 3011 in the horizontal y-direction.

In step 2, the hollow needle positioned in step 1 is lowered in the z-direction into the sample vessel 921, so that the tip of said hollow needle is immersed in the sample liquid, after which a quantity of sample liquid specified by the control device is aspirated into the lowered hollow needle, and subsequently the hollow needle is raised again in the z-direction into the travel position.

In step 3, the hollow needle 307 of the second pipetting module 3012 is brought into the x/y-position of the opening of the reagent vessel 951*a* selected by the control unit by simultaneously moving the pipettor 300 in the horizontal x-direction and the second pipetting module 3012 in the horizontal y-direction.

In step 4, the hollow needle 307 positioned in step 3 is lowered in the z-direction into the reagent vessel 951*a*, so that the tip of said hollow needle is immersed in the reagent liquid, after which a quantity of reagent liquid specified by the control device is aspirated into the lowered hollow needle, and subsequently the hollow needle is raised again in the z-direction into the travel position.

In step 5, the hollow needle 307 of the first pipetting module 3011 that was filled with sample liquid in step 2 is brought into the x/y-position of the filling opening of the receiving vessel 201 by simultaneously moving the pipettor 300 in the horizontal x-direction and the first pipetting module 3011 in the horizontal y-direction, while at the same time the hollow needle 307 of the second pipetting module 3012 that was filled with the reagent liquid in step 4 need only be brought into the y-position of the receiving vessel 201 by simultaneously moving the pipetting module 3012 in the horizontal y-direction.

In step 6, the hollow needle filled with sample liquid is lowered in the z-direction into the receiving vessel 201, thereby dispensing a predetermined quantity of sample liquid, and then is raised again in the z-direction into the travel position.

In step 7, the hollow needle filled with the reagent liquid is brought into the x/y-position of the filling opening of the receiving vessel 201 by moving the pipettor 300 in the horizontal x-direction.

In step 7, therefore, it is no longer necessary to move the second pipetting module 3012 into the y-position of the receiving vessel since the corresponding hollow needle has already been brought into this position in step 5. The beam construction with the pipetting modules moving on the inner longitudinal sides makes it possible in step 5 to bring the two hollow needles toward one another in the x-direction to a spacing in the mm range, so that in step 7 the travel distance and travel time of the pipettor in the x-direction can be kept very small.

In step 8, the hollow needle 307 filled with a reagent liquid is lowered in the z-direction into the receiving vessel 201, thereby dispensing a predetermined quantity of first reagent liquid, and then is raised again in the z-direction into the travel position.

After the actions in step 6 have been carried out, the hollow needle 307 of the first pipetting module 3011 is moved into the y-position of the inlet opening of the needle washing unit 700 moving therewith, and after lowering the needle tip is cleaned therein and then is raised again into the travel position, after which, once the actions in step 8 have been carried out, the hollow needle 307 of the second pipetting module 3012 is moved into the y-position of the inlet opening of the needle washing unit 700 moving therewith, and after lowering the needle tip is cleaned therein and then is raised again into the travel position.

Example 3

The steps set out in Example 3 relate (as in Example 2) to an exemplary transfer protocol for sample processing and/or analysis that is to be carried out on a first liquid, for example a sample liquid, using a second liquid, for example a reagent liquid, it being possible for both liquids to be dispensed simultaneously.

In the following, the first liquid is a sample liquid and the second liquid is a reagent liquid. However, other constellations are also conceivable; for example, the first liquid may be a sample liquid, a reagent or an active ingredient, and the second liquid may be a dilution liquid. The first and the second liquid may also be different reagents.

Steps 1-5 are substantially analogous to steps 1-5 in Example 2.

In step 6, the hollow needle 307 of the first pipetting module 3011 that was filled with the sample liquid in step 2 and the hollow needle 307 of the second pipetting module 3012 that was filled with the reagent liquid in step 4 are simultaneously lowered in the z-direction into the dispensing vessel 201—thereby respectively dispensing a predetermined quantity of sample liquid and a predetermined quantity of reagent liquid—and then are raised again in the z-direction into the travel position.

In step 7, the hollow needle 307 of the first pipetting module 3011 and the hollow needle 307 of the second pipetting module 3012 are successively or simultaneously moved to the x/y-position of the receiving opening 711*a* of the needle washing unit 700 moving synchronously with the pipettor 300, so that the imaginary, common center of the two needles 307 is located above the slot-shaped receiving opening 711*a* of the needle washing unit 700 and, after lowering the needle tips, these are successively or simultaneously cleaned therein (see FIG. 4*b*) and then are raised again into the travel position.

Compared to Example 2, step 7, the step of moving the pipettor 300 in the x-direction can be omitted in Example 3.

The invention claimed is:

1. An automatic pipetting system for transferring liquids from dispensing vessels, into at least one receiving vessel, wherein the system comprises:
    a movable pipettor configured and arranged to be movable along an x-direction, and
    a control unit for controlling the movable pipettor, wherein the movable pipettor includes
    a horizontal running rail oriented along the x-direction;
    an arm including two beams and a base structure, wherein the arm is movably suspended on the horizontal running rail via the base structure enabling movement of said arm along the x-direction, wherein the base structure is coupled to the two beams, and the two beams are oriented parallel to one another and project horizontally in a y-direction,
    a plurality of pipetting modules configured and arranged to be movable along each of the two beams in the y-direction, normal to the x-direction, and each pipetting module of the plurality of pipetting modules includes at least one hollow needle configured and arranged to be lowerable into a plurality of dispensing vessels and a plurality of receiving vessels,
    the pipetting modules of the plurality of pipetting modules are configured and arranged to move independently past one another in the y-direction, and are arranged on mutually facing longitudinal sides of said two beams.

2. The pipetting system according to claim 1, wherein the two beams of the arm are coupled to the base structure at a first end of said two beams and connected to each other by a connecting web at a second end of the two beams remote from the base structure, the base structure, the two beams and the connecting web forming a frame structure.

3. The pipetting system according to claim 1, wherein the at least one hollow needles includes at least two hollow needles configured and arranged to such that a minimal spacing between said two hollow needles in the x-direction is 2 mm to 16 mm.

4. The pipetting system according to claim 1, wherein the movable pipettor includes a mount being attached movably along the y-direction to an outer side of one beam of the two beams, and the mount is configured and arranged to be attached to a working module.

5. The pipetting system according to claim 1, further including a sample and reagent deck having a work surface and a plurality of interchangeable racks or cassettes,
wherein the sample and reagent deck comprises a sample and reagent store, arranged below the work surface of the sample and reagent deck configured to accommodate the plurality of interchangeable racks or cassettes,
wherein dispensing vessels including though-openings are held in the plurality of interchangeable racks or cassettes,
wherein the work surface has through-openings for at least one of the at least one hollow needle of the plurality of two pipetting modules, and
wherein the plurality of interchangeable racks or cassettes can be arranged such that the through-openings of the dispensing vessels are aligned with said through-openings of the work surface.

6. The pipetting system according to claim 5, further including openable covers arranged in the work surface for covering the sample and reagent store, wherein the through-openings are arranged in the covers.

7. The pipetting system according to claim 5,
further including at least one needle washing unit arranged below the work surface, and
wherein the work surface of the sample and reagent deck has a slot-shaped opening along the x-direction,
wherein the at least one hollow needle is configured and arranged to be lowered into the at least one needle washing unit through said slot-shaped opening.

8. The pipetting system according to claim 1, wherein at least one pipetting module of the plurality of pipetting modules includes a plurality of different hollow needles which differ in a type of material of the plurality of different hollow needles, internal volumes of the plurality of different hollow needles or a geometry of the plurality of different hollow needles.

9. The pipetting system according to claim 1, wherein the movable pipettor further includes at least one needle washing unit, wherein the movable pipettor comprises a support structure and the at least one needle washing unit is arranged on the support structure and the support structure is attached to the base structure or to at least one of the two beams of the arm.

10. The pipetting system according to claim 9, wherein the plurality of pipetting modules comprise a first pipetting module and a second pipetting module and wherein the at least one needle washing unit includes a receiving opening configured and arranged to receive the at least one hollow needle of the first pipetting module at the same time as the at least one hollow needle of the second pipetting module.

11. The pipetting system according to claim 9, wherein the at least one needle washing unit is configured and arranged to be movable between a washing position for the at least one hollow needle of a first one of the plurality of pipetting modules and a washing position for the at least one hollow needle of a second one of the plurality of pipetting modules.

12. The pipetting system according to claim 1, further comprising a lifting mechanism for moving the at least one hollow needle along a z-direction, normal to the x-direction and the y-direction, wherein
the at least one hollow needle of at least one pipetting module of the plurality of pipetting modules comprises two jointly movable hollow needles arranged on at least one beam of the two beams of the movable pipettor,
said two jointly movable hollow needles being connected via the lifting mechanism such that the two jointly movable hollow needles are configured and arranged to be movable antiparallel to each other along the z-direction.

13. A method for transferring liquids from a dispensing vessel into a receiving vessel, the method comprising:
providing an automatic pipetting system according to claim 1 including a horizontal work surface, wherein
the movable pipettor comprises a needle washing unit with a receiving opening for receiving a needle to be washed,
a first pipetting module of the plurality of pipetting modules is mounted on a first beam of the two beams and comprises a first hollow needle of the at least one hollow needle, and
a second pipetting module of the plurality of pipetting modules is mounted on a second beam of the two beams and comprises a second hollow needle of the at least one hollow needle;
providing each of the first and second hollow needles in a travel position, in which the first and second hollow needles each are positioned above the horizontal work surface;
providing a dispensing vessel comprising an extraction opening for extracting liquid from the dispensing vessel;
providing a receiving vessel comprising a filling opening for filling liquid into the receiving vessel;
determining an x/y-position of the extraction opening of the dispensing vessel,
determining an x/y-position of the filling opening of the receiving vessel,
determining an extraction amount of liquid to be extracted from the dispensing vessel,
determining a filling amount of liquid to be filled into the receiving vessel,
moving the first hollow needle across said horizontal work surface to the x/y-position of the extraction opening of the dispensing vessel;
lowering the first hollow needle from the travel position into the dispensing vessel, taking up the extraction amount of liquid into the first hollow needle, and raising the first hollow needle into the travel position;
moving the first hollow needle across the horizontal work surface to the x/y-position of the filling opening of the receiving vessel;
lowering the first hollow needle from the travel position into the receiving vessel, dispensing the determined filling amount of liquid from the first hollow needle into the receiving vessel, and raising the first hollow needle into the travel position; and simultaneously with the movement of the first hollow needle, keeping the second hollow needle in the y-direction to the receiving opening of the needle washing unit, regardless of a current position of the first hollow needle.

14. A method for transferring liquids from dispensing vessels, into receiving vessels of an automatic pipetting system, the method comprising:
- providing an automatic pipetting system according to claim 1 comprising a horizontal work surface, wherein the movable pipettor comprises a needle washing unit with a receiving opening for receiving a needle to be washed,
  - a first pipetting module of the plurality of pipetting modules is mounted on a first beam of the two beams and comprises a first hollow needle of the at least one hollow needles, and
  - a second pipetting module of the plurality of pipetting modules is mounted on a second beam of the two beams and comprises a second hollow needle of the at least one hollow needles;
- providing a first dispensing vessel comprising a first liquid and a second dispensing vessel comprising a second liquid, wherein the first and second dispensing vessels each comprise an extraction opening for extracting the respective liquid from the respective dispensing vessel;
- providing a first receiving vessel and a second receiving vessel each comprising a filling opening for filling liquid into the respective receiving vessel;
- providing each of the first and second hollow needles in a travel position, in which the first and second hollow needles each are positioned above the horizontal work surface;
- determining an x/y-position of the extraction opening of the first dispensing vessel,
- determining an x/y-position of the extraction opening of the second dispensing vessel,
- determining an x/y-position of the filling opening of the first receiving vessel,
- determining an x/y-position of the filling opening of the second receiving vessel,
- determining a first extraction amount of the first liquid to be extracted from the first dispensing vessel,
- determining a second extraction amount of the second liquid to be extracted from the second dispensing vessel,
- determining a first filling amount of the first liquid to be filled into the receiving vessel,
- determining a second filling amount of second liquid to be filled into the receiving vessel,
- moving the first hollow needle across said horizontal work surface to the x/y-position of the extraction opening of the first dispensing vessel;
- lowering the first hollow needle from the travel position into the first dispensing vessel, taking up the first extraction amount of the first liquid into the first hollow needle, and raising the first hollow needle into the travel position;
- moving the second hollow needle across the horizontal work surface to the x/y-position of the extraction opening of the second dispensing vessel;
- lowering the hollow needle from the travel position into the second dispensing vessel, taking up the second extraction amount of the second liquid into the second hollow needle, and raising the second hollow needle into the travel position;
- simultaneously moving first hollow needle, filled with the first liquid, to the x/y-position of the filling opening of the receiving vessel and the second hollow needle, filled with the second liquid, to a y-position of the filling opening of the receiving vessel;
- lowering the first hollow needle filled with the first liquid into the receiving vessel, dispensing the determined first filling amount of first liquid from the first hollow needle into the receiving vessel, and raising the hollow needle into the travel position;
- moving the second hollow needle, filled with the second liquid, to an x-position of the filling opening of the receiving vessel and lowering the second hollow needle filled with the second liquid into the receiving vessel, dispensing the determined second filling amount of second liquid from the second hollow needle into the receiving vessel, and raising the second hollow needle into the travel position;
- moving the first hollow needle in the y-direction to the receiving opening of the needle washing unit and cleaning the first hollow needle in the needle washing unit; and
- moving the second hollow needle in the y-direction to the receiving opening of the needle washing unit and cleaning the hollow needle of the second pipetting module in the needle washing unit.

15. A method for transferring liquids from dispensing vessels into receiving vessels of an automatic pipetting system, the method comprising:
- providing an automatic pipetting system according to claim 1 comprising a horizontal work surface, wherein the movable pipettor comprises a needle washing unit with a receiving opening for receiving a needle to be washed,
  - a first pipetting module of the plurality of pipetting modules is mounted on a first beam of the two beams and comprises a first hollow needle of the at least one hollow needles, and
  - a second pipetting module of the plurality of pipetting modules is mounted on a second beam of the two beams and comprises a second hollow needle of the at least one hollow needles;
- providing a first dispensing vessel comprising a first liquid and a second dispensing vessel comprising a second liquid, wherein the first and second dispensing vessels each comprise an extraction opening for extracting the respective liquid from the respective dispensing vessel;
- providing a first receiving vessel and a second receiving vessel each comprising a filling opening for filling liquid into the respective receiving vessel;
- providing each of the first and second hollow needles in a travel position, in which the first and second hollow needles each are positioned above the horizontal work surface;
- determining an x/y-position of the extraction opening of the first dispensing vessel,
- determining an x/y-position of the extraction opening of the second dispensing vessel,
- determining an x/y-position of the filling opening of the first receiving vessel,
- determining an x/y-position of the filling opening of the second receiving vessel, determining a first extraction amount of the first liquid to be extracted from the first dispensing vessel, determining a second extraction amount of the second liquid to be extracted from the second dispensing vessel, determining a first filling amount of the first liquid to be filled into the receiving vessel, determining a second filling amount of second liquid to be filled into the receiving vessel, moving the first hollow needle across said horizontal work surface to the determined x/y-position of the extraction opening of the first dispensing vessel;

lowering the first hollow needle into the first dispensing vessel, taking up the determined first extraction amount of the first liquid into the hollow needle, and raising the hollow needle into the travel position;

moving the second hollow needle across the horizontal work surface to the x/y-position of the extraction opening of the second dispensing vessel;

lowering the second hollow needle into the second dispensing vessel, taking up the determined second extraction quantity of the second liquid into the hollow needle, and raising the hollow needle into the travel position;

simultaneously moving the first hollow needle, filled with the first liquid, and the second hollow needle, filled with the second liquid, to the x/y-position of the filling opening of the receiving vessel;

simultaneously or sequentially lowering the first hollow needle, filled with the first liquid, and the second hollow needle, filled with the second liquid, into the receiving vessel, dispensing first filling amount of the first liquid from the first hollow needle into the receiving vessel and the second filling amount fo the second liquid from the second hollow needle into the receiving vessel, and raising the first and second hollow needles into the travel position; and simultaneously or sequentially moving the first and second hollow needles in the y-direction to the receiving opening of the needle washing unit, and simultaneously or sequentially cleaning the first and second hollow needles in the needle washing unit.

\* \* \* \* \*